UNITED STATES PATENT OFFICE.

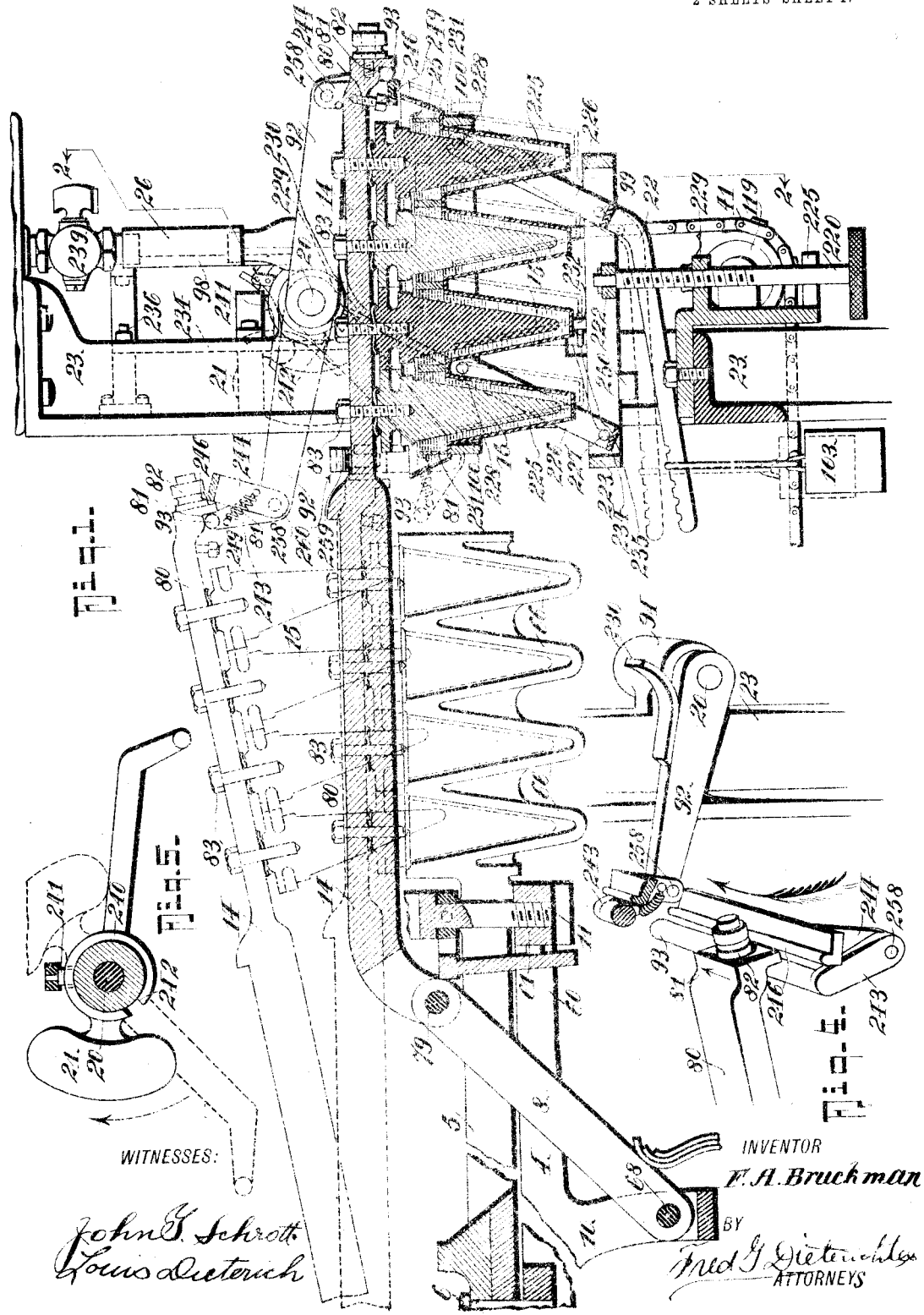

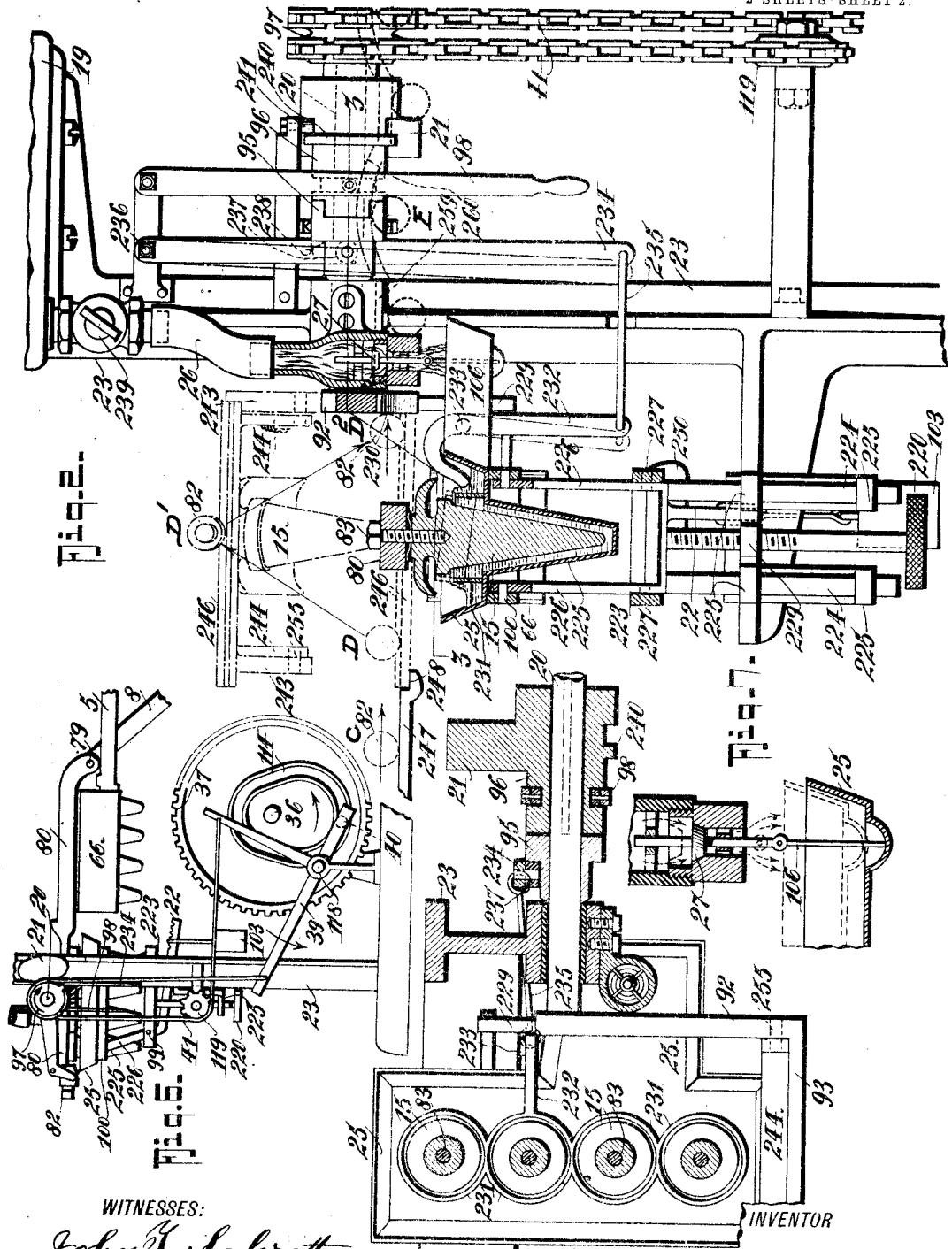

FREDERICK A. BRUCKMAN, OF PORTLAND, OREGON.

ICE-CREAM-CONE MACHINE.

1,075,625.

Specification of Letters Patent.    Patented Oct. 14, 1913.

Application filed July 20, 1912. Serial No. 710,549.

*To all whom it may concern:*

Be it known that I, FREDERICK A. BRUCKMAN, residing at Portland, in the county of Multnomah and State of Oregon, have invented a new and useful Improvement in Ice-Cream-Cone Machines, of which the following is a specification.

My present invention relates to automatic machines for molding, baking, and trimming the ice cream cones, such for example as that disclosed in my co-pending application, Serial #560,568, filed May 11, 1910. In that application is disclosed a machine, consisting of a rotatable wheel which turns on a vertical axis and carries a series of radially disposed female mold sections which turn with the wheel; core members are also provided for the mold sections. The mold sections and the cores, in their travel, pass a loading place, at which is located a loading device, by means of which a batter is supplied to the molding devices. After being loaded, the mold devices pass over baking burners, which bake the contents of the molding devices to the desired degree. After the molding devices have been carried around over the heaters a sufficient distance, they are automatically opened and the baked product is discharged from the same and passes through a trimming mechanism to a conveyer which removes the trimmed cones from the machine.

My present invention provides an improved mechanism which comes into operation at the loading place to effect the charging of the molding devices with batter.

Generically the present invention embodies an oscillatable arm having a track on to which the rollers of the male core carrying arms, pass during the travel of the molding devices from the discharging position through the loading position to the baking position.

The invention also includes an improved mechanism for moving the oscillatable arm to raise the core out of the molds as they pass from the discharging to the loading position while the mold carrying wheel is still turning, and then when the wheel arrives at the loading position and stops, the oscillatable arm completes its act of dipping the cores into the batter pan or tank and removing them from the same and restoring the cores to the female mold sections as the molds move from the loading "stop" position to the beginning of the baking position.

Another object of the present invention is to improve the dipping pan or tank construction and its coöperating parts so as to render the amount of batter supplied to the molds more uniform.

My invention also provides means for adjusting the height of the dipping pan or tank and means are provided to regulate the amount of dipping of each set of cores.

The invention further includes those novel features of construction, combination and arrangement of parts hereinafter fully described and specifically pointed out in the appended claims, reference being had to the accompanying drawings, in which—

Figure 1 is a vertical longitudinal section of a set of molding devices at the loading or dipping position. Fig. 2 is a vertical cross section on the line 2—2 of Fig. 1. Fig. 3 is a horizontal section on the line 3—3 of Fig. 2. Fig. 4 is a detail perspective view of the dipping arm and its track together with a portion of an end of the core carrier. Fig. 5 is another detail view of the oscillatable arm and its counterweight. Fig. 6 is a detail side elevation of the mechanism that operates the dipping arm. Fig. 7 is an enlarged detail section of the cut-off valve in the connection between the dipping pan and the batter reservoir.

In the drawings in which like numerals and letters of reference designate like parts in all the figures, 4 designates a portion of the rotatable wheel which carries the molding devices, the wheel 4 having the rim 61 on which the molding devices rest. The spokes 60 of the wheel have bracket portions 10 on which the links 8, are pivoted at 68. The links 8 carry the core carriers 14 which are pivoted thereto at 79, and the link 8 moves in the slot way between the arms 5 of the female mold sections. The arms 5 are pivoted at 6 to the wheel 4 and stop pins 11 are provided to prevent undue lateral movement of the female mold sections.

The construction of the molding devices *per se*, may be of any approved type as they do not form a part *per se*, of the present invention. The core carrier 14 includes an arm portion 80 to which the cores 15 are fastened by drift bolts 83 or other suitable devices.

66 designates the female mold sections.

The core carrier has a shouldered portion 81 at its front end, and also carries an anti-friction roller 82, which is grooved to ride on the bead 246 of the trackway 244, the trackway 244 being pivoted at 258 to the bearing arms 243 of the rocker arm 92.

93 is the lifting finger which enters the recess or shoulder 81 in the core carrier to lift the cores out of the mold and transfer them to the batter tank or pan hereinafter again referred to. The arm 92 is mounted on a shaft 20 which is mounted in suitable bearings in the frame 23 and is operated through devices best shown in Figs. 2 and 6 of the drawings. On the shaft 20 is a clutch member 95 which has a cam portion 238 for a purpose later explained.

96 is a shifting clutch member which carries the counterweight 21 which may be shifted by a hand lever 98 or other suitable device.

240 is a projecting ring on the clutch member 96 which has an opening 242 to coöperate with the stop 241, so that the clutch member 96 can only be shifted when the opening 242 is in alinement with the stop 241 and the arm 92 is in its normal resting position with the track 243 forming a continuation of the guide or table 247, which is socketed or recessed at 248 to receive such track 246.

97 is a sprocket carried by the clutch member 240 which receives power from a chain 41 that passes over an idler 119 and connects with a rocker bell crank 39, that is pivoted at 118, and is operated through the medium of a cam 114 and roller 40, the cam being mounted on the shaft 36 and carried by one of the gears 37. As the shaft 36 is turned, the rocker bell crank 39 will be rocked and the shaft 20 will be oscillated. A spring continuously tends to hold the track 246 in the position shown in Figs. 1 and 4 of the drawings, while an adjusting screw 249 is provided on the core carrier 80 to coöperate with the underside of the track 246 to adjust the amount of dipping of the cores into the dipping pans that can occur.

223 is a frame, having guides 224, that pass through bearings 225, and the frame 223 has an adjusting screw 220 swivelly secured to it at 222, the adjusting screw passing through threaded bearings 229 on the frame 23, whereby the frame 223 may be raised or lowered as desired.

100 is the frame which carries the batter cans or dipping cans 25, the frame 100 being mounted on arms 226 which are pivoted at 227 and 99 respectively, to the frame 223. They are also pivoted at 228 to the frame 100. The arm 226 has a projection 229 that coöperates with a finger 230 on the oscillatable arm 92 for a purpose later explained. The arm 22 extends downwardly and carries the adjustable weight 103.

250 is a stop, against which the weight carrying projecting portion of the arm 22 rests under normal conditions when the batter pans 25, are loaded.

The batter pans 25 have conical bottoms or pockets and side flanges as best indicated in Figs. 1, 2 and 3 of the drawings, by reference to which it will be observed that within the upper part of the batter pan is a ring 231 for each cone, the rings for the several cones being secured together and carried by a lever 232, which is pivoted at 233 and operated by the pivoted lever 234, that is pivoted at 236 to the frame 23, and has a roller 237 to coöperate with the cam 238 on the clutch member 95. The levers 232 and 234 are connected by a connecting rod 235 best shown in Fig. 2 of the drawings.

D, D¹, D², designate the three positions of the core carrier when engaged by the finger 93 and track 246.

239 is a cut off valve in the duct 26 from the batter reservoir 19. The duct is provided with a check valve 27 whose rod 106 engages the batter can or dipping pan or tank 25, when the weight 103 raises it due to the absence of a sufficient quantity of batter in the dipping cans.

By referring to Fig. 1 it will be seen that a track 259 is indicated in dotted lines and has arch portions 260. This track is disposed in a plane slightly below the plane of travel of the rollers 82 in order to first cause the cores 15 to be forced into the molds 66 to insure an even distribution of batter and then allow them to be moved upwardly, the upward movement being limited by the arch 260 so that steam accumulated through contact of fresh batter with the hot mold may escape, the upward movement of the cores being effected by the escaping steam. One or more of such arch recesses, as indicated at position E, may be provided as desired.

Operation: It should be understood that in the machine of the type on which the present improvements are employed, the wheel 4 has a step by step motion imparted to it by suitable machinery (not herein shown and described). As the wheel arrives at the position C in Fig. 2, the molded product will have been discharged and the molds will be ready for reloading. The next step carries the molding devices from position C, via position D, to position D¹, which latter position is the next "stop." As the molding devices pass from position C they will arrive at position D, at which time the roller 82 will be on the track 246 and the oscillating arm 92 will begin to move from the position shown in dotted lines in Fig. 1 upwardly toward the position shown in dot and dash lines in Fig. 1. By the time the parts have reached the dot and dash line position shown in Fig. 1, the molding devices will have arrived at position D¹ and the wheel 4 will have stopped. A continuation of the movement of the arm 92 in a clockwise direction in Fig. 1, from the dot and dash position, will convey the cores 15 and the core carrier 80 to the full line position, shown in Fig. 1, thus causing the cores to be dipped into the batter pans 25 where a quantity of batter will adhere to them. In passing to the full line position shown in Fig. 1, the finger 230 will engage the projection 229 and rock the links 226 to raise the batter receptacles 25 from the dotted line position in Fig. 1 to the full line position in Fig. 1, so as to keep the cores 15 centrally located in the batter receptacle 25 until the batter has adhered to the cores. The arm 92 then moves in a counter-clockwise direction from the full line position of Fig. 1 back to the dot and dash line position of Fig. 1, at which time the wheel 5 begins to move toward its next step and in moving, as the wheel moves from $D^1$ to $D^2$, the cores 15 will be lowered by the arm 92 back into the female mold section 66 before the roller 82 passes off the end of the track 246. As soon as the cores have been removed from the batter receptacles 25, the weight 103 will hold the batter receptacles elevated, thus opening the valve 27 and permitting the batter to flow into the batter receptacle 25 until the weight 103 has been over balanced sufficiently to allow the receptacle 25 to return to the dotted line position in Fig. 1. At this time the batter is in the upper part of the receptacle 25 and has not yet passed down into the conical bottoms. The cam 238 then engages the roller 237, rocks the lever 234 from the full line to dot and dash line position of Fig 2, to cause the rings 231 to be raised and allow the batter to flow into the conical bottoms 225, after which the rings 231 are again restored to the full line position by gravity and form overflow pockets into which the batter flows as the cores 15 are inserted into the conical bottoms of the dipping tank or batter pan 25. The operations just described are repeated for each set of molds ad infinitum. By adjusting the screw 220 the height of the batter receptacles can be properly adjusted and by adjusting the screw 249 the degree of dipping of the cores into the batter receptacle may be also regulated. When it is desired to stop the feeding of the batter to the molds, the operator simply shifts the clutch 96 to a disengaging position, which can be done as soon as the arm 92 is in the dotted position shown in Fig. 1 and at no other time.

From the foregoing description taken in connection with the accompanying drawings, it is thought the complete construction, operation and advantages of the invention will be apparent to those skilled in the art.

What I claim is:—

1. In a machine of the class described, bodily movable molding devices adapted to be moved from one position to another, each of said devices including female mold members and cores therefor, a core carrier for said cores, a dipping tank relatively stationarily located at a given loading place, means for transferring the cores from the female mold members into the dipping tank and back again to charge the molding devices with batter, said transferring means including an oscillatable arm, an elongated device carried by said arm to engage said core carrier as said molding devices approach, arrive at and leave, the loading position, and means for oscillating said arm.

2. In a machine of the class described, bodily movable molding devices adapted to be moved from one position to another, each of said devices including female mold members and cores therefor, a core carrier for said cores, a dipping tank relatively stationarily located at a given loading place, means for transferring the cores from the female mold members into the dipping tank and back again to charge the molding devices with batter, said transferring means including an oscillatable arm, an elongated device carried by said arm to be engaged by said core carrier as said molding devices approach, pass and leave, the loading position, and means for oscillating said arm, together with means for pivotally supporting said dipping tank, and means coöperative between said tank and arm for moving said tank toward the cores to maintain the cores centralized in the tank while being dipped.

3. In a machine of the class described, bodily movable molding devices adapted to be moved from one position to another, each of said devices including female mold members and cores therefor, a core carrier for said cores, a dipping tank relatively stationarily located at a given loading place, means for transferring the cores from the female mold members into the dipping tank and back again to charge the molding devices with batter, said transferring means including an oscillatable arm, an elongated device carried by said arm to be engaged by said core carrier as said molding devices approach, pass and leave, the loading position, and means for oscillating said arm, said tank including a dipping bottom pocket for each core, and a ring around the mouth of each pocket, means for supplying batter to said tank around said rings, and means for lifting said rings to permit the batter to flow into said pockets.

4. In a machine of the class described, bodily movable molding devices adapted to be moved from one position to another, each of said devices including female mold members and cores therefor, a core carrier for said cores, a dipping tank relatively stationarily located at a given loading place, means for transferring the cores from the female mold members into the dipping tank and back again to charge the molding devices with batter, said transferring means including an oscillatable arm, an elongated device carried by said arm to be engaged by said core carrier as said molding devices approach, pass and leave, the loading position, and means for oscillating said arm, together with means for pivotally supporting said dipping tank, and means coöperative between said tank and arm for moving said tank toward the cores to maintain the cores centralized in the tank while being dipped, said tank including a dipping bottom pocket for each core, and a ring around the mouth of each pocket, means for supplying batter to said tank around said rings, and means for lifting said rings to permit the batter to flow into said pockets.

5. In a machine of the class described, bodily movable molding devices adapted to be moved from one position to another, each of said devices including female mold members and cores therefor, a core carrier for said cores, a dipping tank relatively stationarily located at a given loading place, means for transferring the cores from the female mold members into the dipping tank and back again to charge the molding devices with batter, said transferring means including an oscillatable arm, an elongated device carried by said arm to be engaged by said core carrier as said molding devices approach, pass and leave, the loading position, and means for oscillating said arm, said arm oscillating means including a rock shaft, a clutch member fixed to said shaft, a shiftable clutch member loose on said shaft, means for applying a force to said shiftable clutch member by which said member may be oscillated, means for shifting said shiftable clutch member, and means holding said shifting means inoperative save when said arm is in its initial position.

6. In a machine of the class described, bodily movable molding devices adapted to be moved from one position to another, each of said devices including female mold members and cores therefor, a core carrier for said cores, a dipping tank relatively stationarily located at a given loading place, means for transferring the cores from the female mold members into the dipping tank and back again to charge the molding devices with batter, said transferring means including an oscillatable arm, an elongated device carried by said arm to be engaged by said core carrier as said molding devices approach, pass and leave, the loading position, and means for oscillating said arm, together with means for pivotally supporting said dipping tank, and means coöperative between said tank and arm for moving said tank toward the cores to maintain the cores centralized in the tank while being dipped, said arm oscillating means including a rock shaft, a clutch member fixed to said shaft, a shiftable clutch member loose on said shaft, means for applying a force to said shiftable clutch member by which said member may be oscillated, means for shifting said shiftable clutch member, and means holding said shifting means inoperative save when said arm is in its initial position.

7. In a machine of the class described, bodily movable molding devices adapted to be moved from one position to another, each of said devices including female mold members and cores therefor, a core carrier for said cores, a dipping tank relatively stationarily located at a given loading place, means for transferring the cores from the female mold members into the dipping tank and back again to charge the molding devices with batter, said transferring means including an oscillatable arm, an elongated device carried by said arm to be engaged by said core carrier as said molding devices approach, pass and leave, the loading position, and means for oscillating said arm, said tank including a dipping bottom pocket for each core, and a ring around the mouth of each pocket, means for supplying batter to said tank around said rings, and means for lifting said rings to permit the batter to flow into said pockets, said arm oscillating means including a rock shaft, a clutch member fixed to said shaft, a shiftable clutch member loose on said shaft, means for applying a force to said shiftable clutch member by which said member may be oscillated, means for shifting said shiftable clutch member, and means holding said shifting means inoperative save when said arm is in its initial position.

8. In a machine of the class described, bodily movable molding devices adapted to be moved from one position to another, each of said devices including female mold members and cores for, a core carrier for said cores, a dipping tank relatively stationarily located at a given loading place, means for transferring the cores from the female mold members into the dipping tank and back again to charge the molding devices with batter, said transferring means including an oscillatable arm, an elongated device carried by said arm to be engaged by said core carrier as said molding devices approach, pass and leave, the loading position, and means for oscillating said arm, together with means for pivotally supporting said dipping tank, and means coöperative between said tank and arm for moving said tank toward the cores to maintain the cores centralized in the tank while being dipped, said tank including a dipping bottom pocket for each core, and a ring around the mouth of each pocket, means for supplying batter to said tank around said rings, and means for lifting said rings to permit the batter to flow into said pockets, said arm oscillating means including a rock shaft, a clutch member fixed to said shaft, a shiftable clutch member loose on said shaft, means for applying a force to said shiftable clutch member by which said member may be oscillated, means for shifting said shiftable clutch member, and means holding said shifting means inoperative save when said arm is in its initial position.

9. In a machine of the class described, bodily movable molding devices adapted to be moved from one position to another, each of said devices including female mold members and cores therefor, a core carrier for said cores, a dipping tank relatively stationarily located at a given loading place, means for transferring the cores from the female mold members into the tank and back again to charge the molding devices with batter, said transferring means including an oscillatable arm, a shaft on which said arm is mounted, a clutch member turning with said shaft, a shiftable clutch member coöperative with said first mentioned clutch member, means for applying power to oscillate said shaft and arm when said clutch members are engaged, means for shifting said shiftable clutch member only when said arm is in an initial position.

10. In a machine of the class described, bodily movable molding devices adapted to be moved from one position to another, each of said devices including male and female mold members, a core carrier for said male mold members, an oscillatable arm for coöperating with said core carrier to remove said male mold members out of the female mold members and convey the same to a loading position, a dipping tank at such loading position to receive said male mold members, said conveying means including an oscillatable arm, and a trackway carried by said arm for engaging said core carrier while the molding devices are being moved from one position to another, means for oscillating said arm, and means for centralizing said dipping tank with relation to said male mold members, as said male mold members are projected into said dipping tank.

11. In a machine of the class described, bodily movable molding devices adapted to be moved from one position to another, each of said devices including male and female mold members, a core carrier for said male mold members, an oscillatable arm for coöperating with said core carrier to remove said male mold members out of the female mold members and convey the same to a loading position, a dipping tank at such loading position to receive said male mold members, said conveying means including an oscillatable arm, and a trackway carried by said arm for engaging said core carrier while the molding devices are being moved from one position to another, means for oscillating said arm, and means for centralizing said dipping tank with relation to said male mold members, as said male mold members are projected into said dipping tank, said last named means comprising a support on which said dipping tank is pivotally mounted, a finger on said oscillatable arm, and a member carried by said support coöperative with said finger for moving said tank on its pivot as said oscillatable arm deposits said male mold members into said dipping tank.

12. In a machine of the class described, bodily movable molding devices adapted to be moved from one position to another, each of said devices including male and female mold members, a core carrier for said male mold members, an oscillatable arm for coöperating with said core carrier to remove said male mold members out of the female mold members and convey the same to a loading position, a dipping tank at such loading position to receive said male mold members, said conveying means including an oscillatable arm, and a trackway carried by said arm for engaging said core carrier while the molding devices are being moved from one position to another, means for oscillating said arm, and means for centralizing said dipping tank with relation to said male mold members, as said male mold members are projected into said dipping tank, said last named means comprising a support on which said dipping tank is pivotally mounted, a finger on said oscillatable arm, and a member carried by said support coöperative with said finger for moving said tank on its pivot as said oscillatable arm deposits said male mold members into said dipping tank, means for counterbalancing said dipping tank, and means for supplying said dipping tank with batter, together with means for adjustably mounting said dipping tank whereby it may be raised and lowered as a whole with relation to the final dipping position of said male mold members.

13. In a machine of the class described, bodily movable molding devices adapted to be moved from one position to another, each of said devices including male and female mold members, a core carrier for said male mold members, an oscillatable arm for coöperating with said core carrier to remove said male mold members out of the female mold members and convey the same to a loading position, a dipping tank at such loading position to receive said male mold members, said conveying means including an oscillatable arm, and a trackway carried by said arm for engaging said core carrier while the molding devices are being moved from one position to another, means for oscillating said arm, and means for centralizing said dipping tank with relation to said male mold members, as said male mold members are projected into said dipping tank, said last named means comprising a support on which said dipping tank is pivotally mounted, a finger on said oscillatable arm, and a member carried by said support coöperative with said finger for moving said tank on its pivot as said oscillatable arm deposits said male mold members into said dipping tank, said dipping tank including pockets for the male mold members, rings in said tank at the mouths of said pockets, and means for raising said rings to permit the batter to flow into said pockets at times.

14. In a machine of the class described, a set of bodily movable molding devices adapted to be moved from one position to another, and including a pivoted and longitudinally movable core carrier, cores carried thereby, an oscillatable arm, a hinged track member carried by said arm to engage said core carrier to lift the same and move it on its pivot from one position to another as said molding devices are bodily moved from one position to another, a finger carried by said arm and paralleling said track member, a roller on said core carrier coöperating with said track member, and means for oscillating said arm to lift and move said core carrier longitudinally.

15. In a machine of the class described, a set of bodily movable molding devices adapted to be moved from one position to another, and including a pivoted and longitudinally movable core carrier, cores carried thereby, an oscillatable arm, a hinged track member carried by said arm to engage said core carrier to lift the same and move it on its pivot from one position to another as said molding devices are bodily moved from one position to another, a finger carried by said arm and paralleling said track member, a roller on said core carrier coöperating with said track member, and means for oscillating said arm to lift and move said core carrier longitudinally, a dipping tank, and coöperative connections between said dipping tank and said arm for elevating said tank as said core carrier is brought over the same to bring said dipping tank into proper coöperative position with relation to the cores carried by said core carrier.

16. In a machine of the class described, a set of bodily movable molding devices adapted to be moved from one position to another, and each including a pair of female mold members and cores therefor, a core carrier for said cores, means for lifting the cores out of the female molds and supplying batter thereto, means for pressing the cores into the molds after the batter has been supplied to distribute the batter through the molds, said means including a trackway coöoperated with said core carrier, said trackway having undulations to permit the upward yielding of said cores as said molding devices pass from one position to another to thereby allow the escape of steam.

FREDERICK A. BRUCKMAN.

Witnesses:
  J. A. McFeron,
  A. A. Hughes.